Sept. 8, 1936. F. STONEBRAKER, SR Re. 20,104

DISPLAY SIGN

Original Filed Aug. 16, 1934

WITNES

Lawrence D. Mankin

INVENTOR

Fred Stonebraker, Sr.,

BY

Munn, Anderson, Stanley, Foster & Liddy

ATTORNEYS

Reissued Sept. 8, 1936

Re. 20,104

UNITED STATES PATENT OFFICE 20,104

DISPLAY SIGN

Fred Stonebraker, Sr., San Diego, Calif., assignor of one-fourth to Evan H. Curtiss and one-fourth to Harry R. Collins, both of San Diego, Calif.

Original No. 2,031,620, dated February 25, 1936, Serial No. 740,169, August 16, 1934. Application for reissue June 19, 1936, Serial No. 86,190

5 Claims. (Cl. 40—126)

My invention relates to improvements in display signs, and it consists in the combinations, constructions and arrangements herein described and claimed.

An object of my invention is to provide a sign for simulating an article, such as a bottle, containing liquid.

A further object is to provide a sign in which the outline of the article, such as the bottle, is made on transparent material, such as glass, cellophane and the like, and in which means is provided for giving the appearance of a third dimension, i. e., thickness, to the simulated bottle, and also the appearance of liquid having light reflected from the same.

Other objects and advantages will appear in the following specification and the novel features of the invention will be particularly pointed out in the appended claims.

My invention is illustrated in the accompanying drawing forming part of this application, in which.

Figure 1:
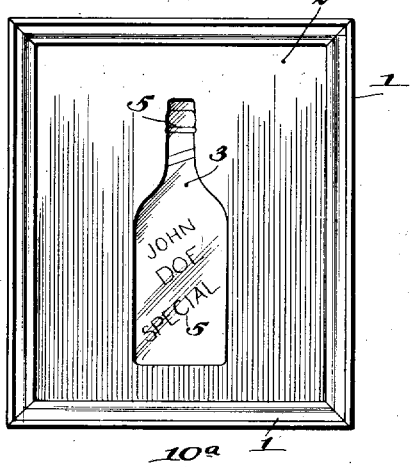
Fig. 1 is a face view of one form of the invention.

In carrying out my invention I make use of a frame 1 similar to a picture frame. Disposed in this frame is an opaque sheet 2, preferably made of metal, wood, cardboard or other similar opaque material. This sheet has a cut-out portion 3 in the shape of a bottle or other object. The rear of the plate 2 is a transparent plate 4 of glass, cellophane, or other suitable transparent material.

Figure 2:
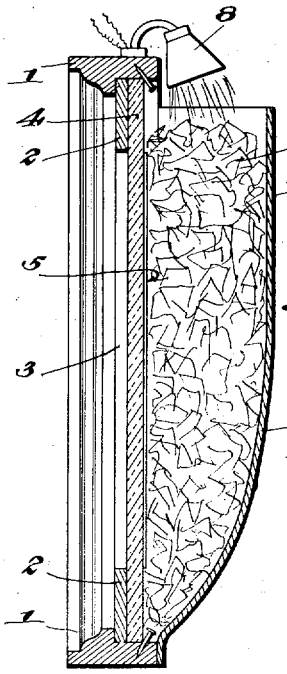
Fig. 2 is an enlarged sectional view of the device shown in Fig. 1, with illuminating means.

In order to more nearly simulate the bottle, a legend, such as that shown in Fig. 1 at 5, may be painted or otherwise impressed on the surface of the plate 4, and portions of the object, such as the neck of the bottle, may be sketched or painted on the transparent material, as indicated in Fig. 1. In Fig. 2 I have shown this decoration as being at 5 on the rear of the plate 4, but it is obvious that it might be on the front of the plate without departing from the spirit of the invention.

Secured to the frame 1 at the rear end thereof, is a curved reflector 6. In the present instance the reflector, being used to aid in simulating a bottle of liquid, is curved to conform substantially to the curvature of the bottle. Between the reflector and the transparent plate 4 I place crumpled cellophane 7, which not only is transparent, but may receive light in such a way as to reflect it from one portion to the other. In Fig. 2 I have shown a space between the outer edge of the reflector 6 and the frame. A lamp 8 may be used for illuminating the cellophane.

The arrangement described above when viewed from the front, and particularly when viewed at some distance, has the appearance of a bottle filled with liquid. Obviously the color of the liquid thus simulated may be varied by using cellophane or other similar transparent and reflecting material of varying colors, as desired.

Figure 3:
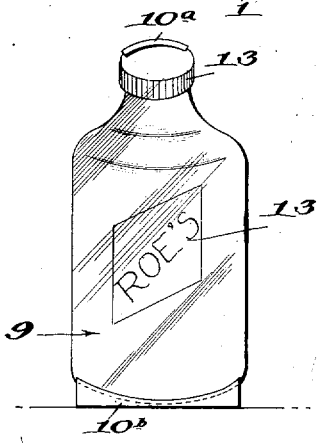
Fig. 3 is an elevational view of another form of the device.
Figure 4:
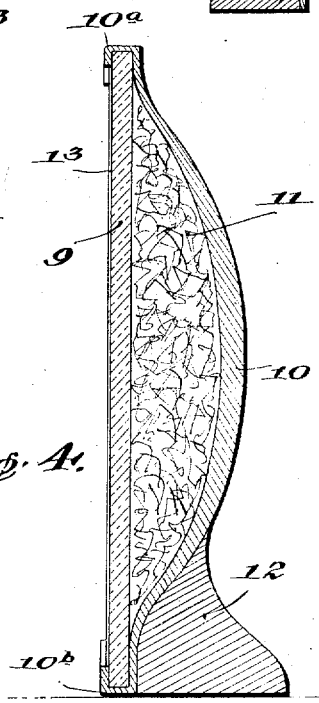
Fig. 4 is an enlarged sectional view of the device shown in Fig. 3.

In Figs. 3 and 4 I have shown a modified form in which the frame is dispensed with. In this form of the device a transparent plate 9 is cut or shaped in the form of the object designed to be simulated, such as the bottle in Fig. 3.

A reflector of polished metal or the like such as that shown at 10 in Fig. 4 is provided, and the upper and lower portions are provided with flanges 10*a* and 10*b*, respectively, for holding the plate. Between the reflector and the transparent plate is a filling of crumpled cellophane oh similar material 11. The reflector is mounted on a base 12. The transparent plate 9 has painted or otherwise produced thereon legends such as that shown at 13, and a simulation, in perspective, of the bottle.

In this form of the device, the light in front of the sign passes through the transparent plate 9 and through the crumpled cellophane, and is reflected from the inner surface of the reflector back again, and this gives the appearance of depth to the bottle and simulates the reflection of light from the rear side of a bottle through the liquid contained therein.

Obviously the forms of the bottles or containers of the liquid might be varied without departing from the spirit of the invention.

I am aware that it has been proposed to place material in the rear of a transparent plate for causing the appearance of a dazzling sparkling effect, or for reflecting the light through the plate to cause a decorative effect, but I know of no device which is designed to produce the illusion of a third dimension and simultaneously produce the illusion of a liquid in a container which is depicted on a flat surface.

I claim:

1. A sign comprising a frame, an opaque plate carried by the frame and having a cut-out portion simulating a container, a transparent plate in the rear of said opaque plate and having lines depicting portions of the container, a reflector secured to the frame in the rear thereof and being spaced from the frame at the top to provide for the entrance of light between the reflector and the frame, and transparent crumpled cellophane disposed between the reflector and said transparent plate for causing the illusion of depth to the container.

2. A sign comprising a transparent plate formed in the outline of a container and having lines thereon to simulate portions of the container, a reflector disposed in the rear of the transparent plate and having flanges arranged to engage the bottom and the top of the plate for holding the plate rigidly in position, a base for holding the reflector, and transparent crumpled cellophane disposed between the reflector and the transparent plate whereby light from the front of the plate will be reflected from the reflector and the cellophane through the plate, thereby giving the illusion of depth to the container.

3. A sign comprising a transparent plate having a visible outline of a translucent body to be simulated, a reflector positioned back of at least that portion of said plate within said visible outline, and a crumpled transparent paper material disposed between the reflector and the transparent plate back of the translucent body outlined thereon, whereby light entering through the front of the plate will be reflected from the reflector back through the crumpled material and through the plate, thereby giving the illusion of depth to the portion of said plate simulating the translucent body.

4. A sign comprising a transparent plate, having a visible outline of a translucent body to be simulated, a reflector positioned back of said plate, means for preventing entry of light from the sides of said sign between the edges of said plate and reflector, and a crumpled transparent paper material disposed between the reflector and the transparent plate back of the translucent body outlined thereon whereby light entering through the front of the plate will be reflected from the reflector back through the crumpled material and through the plate, thereby giving the illusion of depth to the portion of said plate simulating the translucent body.

5. A sign comprising a transparent plate having a visible outline of a translucent body to be simulated and having lines thereon to simulate lines of the body within the margins thereof, a reflector disposed to the rear of the transparent plate, means for joining the plate and reflector and crumpled, thin, transparent paper material disposed between the reflector and the transparent plate whereby light from the front of the plate will be reflected from the reflector and the crumpled transparent material through the plate, thereby giving the illusion of depth to the translucent body depicted.

FRED STONEBRAKER, SR.